United States Patent [19]
Pfanstiehl et al.

[11] Patent Number: 5,831,430
[45] Date of Patent: Nov. 3, 1998

[54] MULTIPLE REMOTE PROBE ELECTRONIC THICKNESS GAUGE WITH PROBE HOLDER

[76] Inventors: John Pfanstiehl, 22025 US 19N, Clearwater, Fla. 34625; Garrett A. Morelock, 1500 Woodward Ave., Bloomfield Hills, Mich. 48304

[21] Appl. No.: 579,222

[22] Filed: Dec. 28, 1995

[51] Int. Cl.⁶ .................... G01B 7/06; G01R 33/12
[52] U.S. Cl. .................... 324/230; 324/115; 324/227; 324/262
[58] Field of Search .................... 324/133, 115, 324/72.5, 754–758, 149, 262, 156, 157, 230, 227

[56] References Cited

U.S. PATENT DOCUMENTS

| | | | |
|---|---|---|---|
| 2,862,178 | 11/1958 | Moore | 324/230 |
| 2,903,645 | 9/1959 | Wright et al. | 324/230 |
| 3,441,840 | 4/1969 | Randle | 324/230 |
| 3,986,105 | 10/1976 | Nix et al. | 324/230 |
| 5,153,511 | 10/1992 | Lee | 324/115 |
| 5,162,725 | 11/1992 | Hodson et al. | 324/754 |
| 5,241,280 | 8/1993 | Aidun et al. | 324/671 |
| 5,343,146 | 8/1994 | Koch et al. | 324/230 |
| 5,467,014 | 11/1995 | Nix | 324/230 |
| 5,581,175 | 12/1996 | Yoneyama et al. | 324/115 |

*Primary Examiner*—Jay M. Patidar
*Attorney, Agent, or Firm*—Gifford, Krass, Groh, Sprinkle, Patmore, Anderson & Citkowski, P.C.

[57] ABSTRACT

A probe holder mounted to a main housing of an electronic thickness gauge, of the type having a remote probe connected to the main housing by an elongate cable, enables the gauge to be used in its initial configuration when the probe is out of the holder and as an integral unit when the probe is positioned in the holder. The holder may be retrofit onto an existing gauge by making it an integral part of a battery cover that replaces an original battery cover. A second embodiment includes a cylindrical remote probe holder having independent, dedicated sensors mounted at its opposite ends to facilitate switching from one type of sensor to another, a third embodiment provides multiple remote probes independently interconnected to the main housing by elongate cables, and a fourth embodiment mounts remote probes in a "V"-shaped housing to enable switching from a first probe to a second by rotating the housing about an axis of rotation.

11 Claims, 5 Drawing Sheets

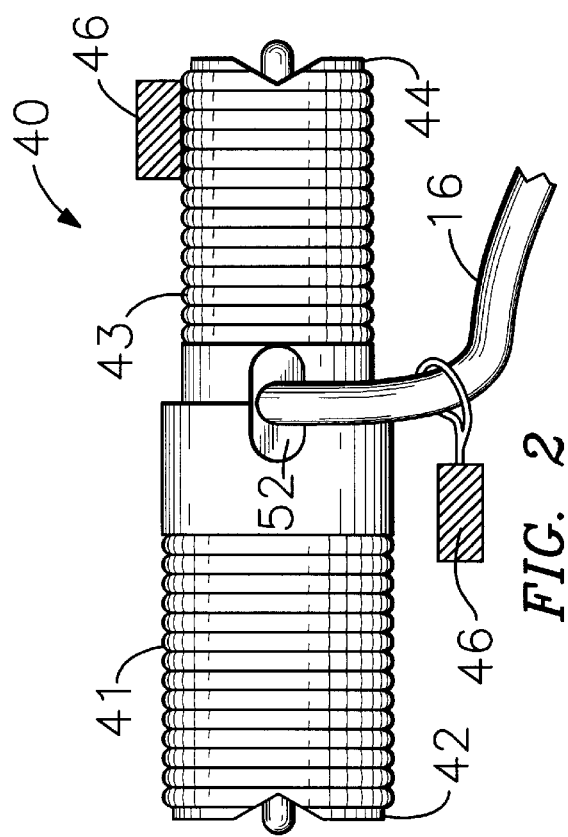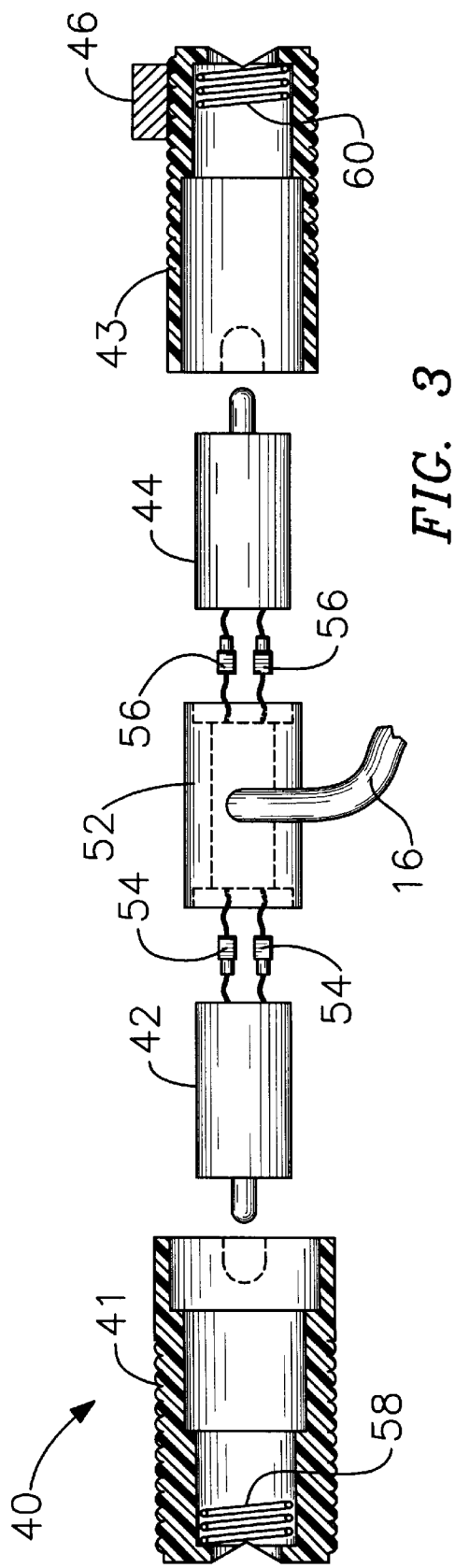

MULTIPLE REMOTE PROBE ELECTRONIC THICKNESS GAUGE WITH PROBE HOLDER

BACKGROUND OF THE INVENTION

1. Field of the invention

This invention relates, generally, to electronic thickness gauges. More particularly, it relates to a gauge construction that enables reconfiguration of a remote probe gauge into an integral probe gauge and to constructions that provide multiple independent probes in a single gauge.

2. Description of the prior art

The field of coating thickness gauges has been active over the past decade as the cost of coatings has escalated together with the cost of minimizing pollution from application of such coatings. Other major factors in this field include the rapid increase in the number of companies striving for ISO 9000 certification, and the decreasing cost of gauges due to microprocessor technology advances. In spite of the many models and types of new gauges introduced by the world's leading manufacturers, none of them has yet found a way to provide the advantages of remote probes and integral probes in a single gauge.

There are two types of conventional electronic coating thickness gauges. The first type includes a probe that is integral to the housing of the gauge, and the second type includes a remote probe, i.e., a probe connected to the housing by an elongate cable to facilitate the placement of the probe in hard to reach locations.

Integral probes allow the user to take measurements with one hand. There are many applications in industry where this is desirable, e.g., when one hand is required for other functions, such as holding onto a ladder. Examples of integral probe gauges include the original Positector, made in Germany, and the more recent Positector 5000, shown in U.S. Pat. No. 5,241,280 to Aidun et. al. Other examples include the Elcometer 246 and the more recent Elcometer 345, both made in England.

Remote probes are considerably smaller and lighter than a gauge housing and therefore allow more stable placement on a substrate than probes that are integral with such housing. Typically, a remote probe is connected to the gauge housing by an elongate cable, thereby facilitating the taking of measurements in remote areas, such as the roof of a van.

Examples of coating thickness gauges with remote probes include the ETG gauge, manufactured by Pro Motorcar Products, Inc. of Clearwater, Fla., Elcometer model 355, and Fisher Deltascope models. Additionally, the Positector 6000 and the Elcometer 345 have optional models which, for an increased price, include remote probes instead of integral probes.

It would be advantageous to have a coating thickness gauge that provides the stability and precision of a remote probe but which also could be used with one hand when the application required.

The most common types of electronic coating thickness gauges are either designed for measuring coatings on ferrous metal substrates or for measuring coatings on non-ferrous metal substrates. In the past, users bought one type of gauge or the other depending on their needs.

More recently, "combination" gauges have been developed which include circuitry for both ferrous and non-ferrous substrates. Some manufacturers, such as Elcometer, have designed combination gauges in which the user chooses either the ferrous or non-ferrous probe and plugs that probe into the gauge. This expedient has the disadvantage that it requires the user to carry two types of probes, change the probe when needed, and possibly recalibrate the gauge.

The inconvenience of this type of gauge becomes evident when measuring coating thickness on modern cars that have some exterior body panels made of steel and some made of aluminum.

Another combination gauge of the prior art has a ferrous probe on a first side of the housing and a non-ferrous probe on a second side thereof. The pie-shaped Qua-Nix Automation 1500 gauge, made in Germany, is an example of this design; the entire gauge has to be inverted when making measurements on a different substrate. Another disadvantage is that two displays have to be built into gauges of this type, i.e., there must be one on each side. Additionally, this design also has all the inherent disadvantages of an integral probe gauge.

A third type of combination gauge has ferrous and non-ferrous elements inside a single probe. U.S. Pat. No. 3,986,105 to Nix et. al. describes a probe which has a number of coils wound concentrically around a core. Low frequency excitation currents are used to measure coating thickness on magnetic materials and higher excitation frequencies are used to induce eddy currents for measurements on non-magnetic materials.

Another example of a combination probe is described in U.S. Pat. No. 5,343,146 to Koch et. al. In this design, a Hall effect magnetic flux density sensor is placed in close proximity to an eddy current coil. Both are positioned in near proximity to the end of a single probe tip.

When ferrous and nonferrous sensors are combined into one probe tip, compromises have to be made to enable acceptance of both types of sensor into the same location in a single probe, i.e., the accuracy of each type of sensor is compromised. No manufacturer of gauges with combination probes claims 1% accuracy for those gauges, but a number of gauges with probes dedicated to either ferrous or non-ferrous substrates have claims of 1% accuracy.

Generally, the closer an individual sensing device can be positioned relative to a substrate, the more accurately it can measure the distance from that substrate, said distance being the coating thickness. Only one of two sensors can be positioned close to the substrate in many of the two sensor prior art designs.

Optimizing accuracy and resolution in probe design is particularly important because many modern coating thickness gauges now display measurements to one hundredth of a mil (10 millionths of an inch) or one tenth of a micron (about 5 millionths of an inch) on thinner coatings.

SUMMARY OF THE INVENTION

The present invention overcomes all of the primary disadvantages of the prior art devices and methods; it provides a single gauge equipped with remote probes that are easily converted into integral probes, and vice versa. Additional embodiments provide two or more separate dedicated probe sensors in a single remote probe housing.

A first embodiment of the present invention provides a novel holder for a remote probe that enables the remote probe to be securely attached to the gauge housing or to be detached therefrom when the benefits of a remote probe are desired. The remote probe is used when needed for access to remote or hard to reach locations and also provides an extra degree of stability for measurements where the highest precision is needed. When one-hand operation is required, the remote probe is inserted into a novel probe holder which is securely attached to the gauge housing to enable the gauge and probe to be used as a unit. Thus, the first embodiment of the invention provides the advantages of both remote probe gauges and integral probe gauges in a single gauge.

A second embodiment provides a novel holder for two independent sensors on one double-ended remote probe; such novel arrangement does not require the compromises associated with combining two sensors in a single probe. It is advantageous to have two probes on a single cable to provide access to remote or hard to reach areas. Moreover, two probes on a single cable provide an extra degree of stability for precision readings and do not require that an entire gauge be inverted when switching from measuring a coating thickness on one type of substrate to another.

The first embodiment provides the advantages of both integral and remote probe gauges. The second embodiment provides the advantages of both dedicated probes and combination gauges in a gauge that never needs to be turned over. Both of these embodiments may also be used together in a single gauge to provide the advantages of remote and integral probes on a combination gauge having separate dedicated sensors.

A third embodiment provides multiple probes interconnected to a housing by multiple elongate cables. One example of the third embodiment is a probe housing that accommodates a magnetic sensor for magnetic substrates, an eddy current sensor for nonmagnetic metal substrates, and an ultrasonic sensor for nonmetal substrates. A plurality of sensors is needed to permit accurate measurements of coating thickness on articles of manufacture, such as modern automobiles, which have coated parts made from each of these three categories of materials.

Another example of the third embodiment is a probe housing that accommodates a plurality of coating thickness sensors together with a temperature sensor. Surface temperature is an important parameter for paint curing in the application process and whenever monitoring or logging temperature together with coating thickness is desirable. Other reasons for monitoring temperature include the effect it has on the softness of the coating and therefore upon the accuracy of the reading. Sensors are typically spring-loaded with approximately three ounces of pressure on a small diameter central contact pin. This force is sufficient to cause the pin to sink into soft coatings and thereby produce a coating thickness reading that is too low.

A fourth embodiment provides a "V"-shaped housing that carries two independent probes. Such fourth embodiment has all the advantages of the previously described embodiments and further allows the user to switch from one probe to another with a small rotation of the wrist. Such small angular rotation of the wrist is easier for the user in some applications than turning the wrist 180 degrees. This also provides all the advantages of a remote probe and a dedicated probe in a combination gauge without having to invert the gauge or having to remove and replace a probe to measure coatings on differing substrates. The construction of the fourth embodiment shown in FIG. 5 also employs a housing to physically connect the two sensors for convenience but allows them to be removed for independent use in applications where desirable, such as in small or otherwise confined areas. This embodiment uses a separate cable for each dedicated sensor.

An unillustrated fifth embodiment includes a housing that positions the sensors in a radial pattern similar to the above-summarized "V"-shaped probe so that the user may choose which sensor contacts the coating by means of a small rotation or rocking of the probe housing.

In addition to convenience, combining the advantages of integral and remote probe gauges in one gauge has a number of important economic advantages. For manufacturers and gauge distributors, the present invention allows the cutting in half of the number of gauge models which they produce or sell. Reducing the number of stocking units and simplifying the model line is a prime business concern. Because the popular coating thickness gauges are generally offered with a number of extra cost options such as statistics, memory, different measurement ranges and so forth, the total number of gauges in just one particular model such as the Elcometer 345 line or the Positector 6000 line can be as high as twenty or more.

The present invention also produces a considerable economic savings for the gauge user. If a user has applications that require both a remote probe gauge and an integral probe gauge, only one novel gauge need be purchased. In addition, if the user's needs change from requiring a remote probe gauge to requiring an integral probe gauge, the remote probe gauge is easily reconfigured into an integral probe gauge, saving the user the expense of purchasing another gauge; an opposite reconfiguration is just as easy.

The present invention fulfills the twin objectives of providing two independent, dedicated sensors for precision measurements in remote or hard to reach areas in a gauge that need not be inverted and in a gauge requiring no removal and replacement of probes. The present invention accomplishes both of these objectives in an easy to manufacture and easy to use product.

It is thus understood that the primary object of this invention is to provide a combination coating thickness gauge having both remote and integral probes.

Another object is to accomplish the foregoing object in a way that does not compromise the integrity of the readings obtainable through the probes.

Still another object is to provide probe housings that are easy to handle when switching from one type of probe to another.

These and other important objects, features, and advantages of the invention will become apparent as this description proceeds.

The invention accordingly comprises the features of construction, combination of element and arrangement of parts that will be exemplified in the construction hereinafter set forth, and the scope of the invention will be indicated in the claims.

BRIEF DESCRIPTION OF THE DRAWINGS

For a fuller understanding of the nature and the objects of the invention, reference should be made to the following detailed description, taken with the accompanying drawings, in which:

FIG. 2 is a side elevational view of the second embodiment in its assembled configuration;

FIG. 3 is an exploded view of the embodiment depicted in FIG. 2;

DETAILED DESCRIPTION OF THE PREFERRED EMBODIMENT

Figure 1:
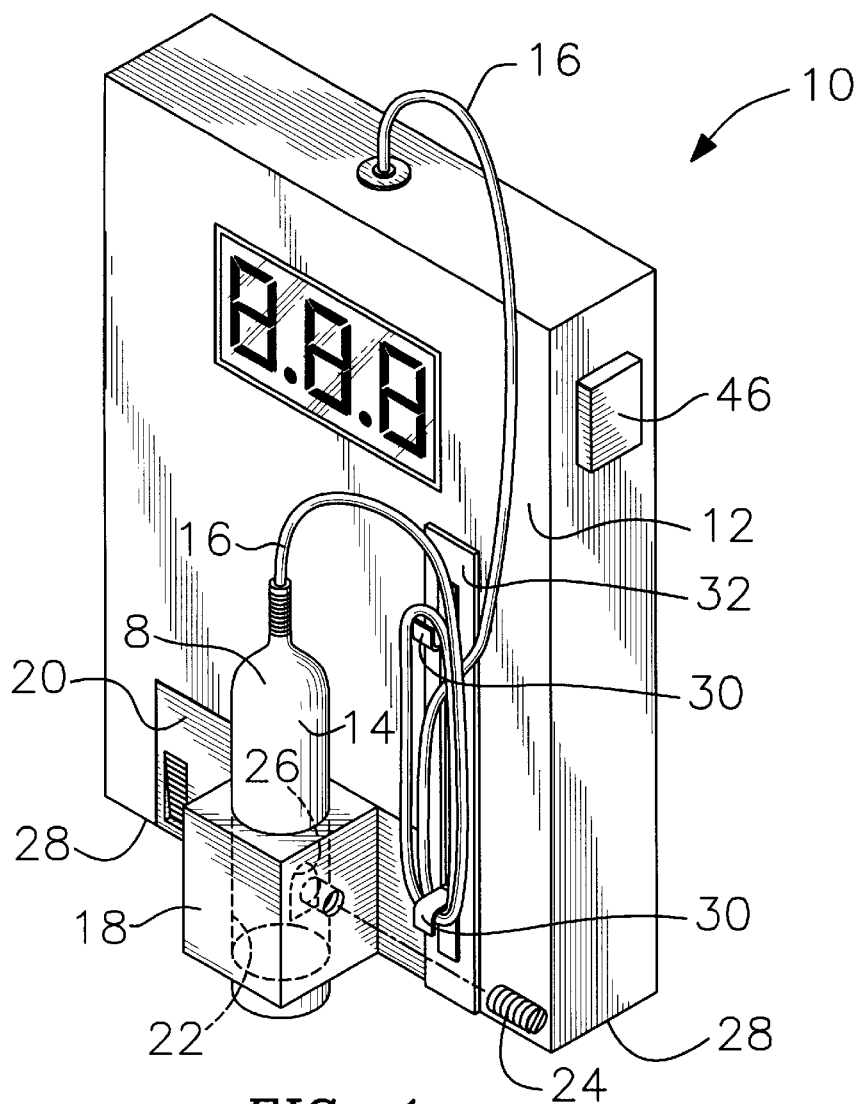
FIG. 1 is a perspective view of the first embodiment.

Referring now to FIG. 1, it will there be seen that the first embodiment of the novel combination probe holder, in its integral configuration, is denoted as a whole by the reference numeral 10. It includes a main housing or enclosure 12 that houses conventional electronic thickness gauge electronics. Gauge 10 includes a remote probe 14 that is in electrical communication with such electronics through elongate cable 16.

A probe holder 18 may be formed integrally with main housing 12 or with removable battery cover 20. Advantageously, when said probe holder 18 is formed integrally with battery cover 20, it may be retrofit onto a conventional remote probe housing 12 by the simple expedient of replacing the conventional battery cover with the novel battery cover 20 having probe holder 18 attached thereto.

A bore 22 is formed in probe holder 18 and may be adapted to releasably receive probe 14 in numerous ways, including a simple press fit, a snap fit, and the like. To ensure a positive lock between probe 14 and its holder 18, the preferred locking means is a screw 24 that is received within a recess 26 formed in probe 14. The screw could be replaced by a spring-loaded detent, or the like.

Figure 1A:
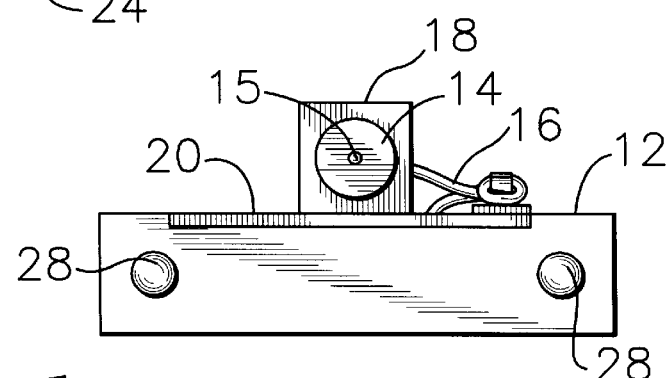
FIG. 1A is a bottom plan view of said first embodiment.

Rubber feet or mounting pads 28 (FIG. 1A) are secured by suitable means to or are integrally formed with the bottom wall of main housing 12 to ensure that probe 14 squarely contacts a coated surface when the device is used in its integral configuration. Note that said feet cooperate with probe tip 15 to form a tripod, i.e., a three-point contact which works well on flat coated surfaces and upon those surfaces that are not perfectly flat.

Wire loom brackets 30 (FIG. 1) provide means for wrapping cable 16 neatly and securely out of the way when probe 14 is in probe holder 18. Said wire loom brackets 30 may be retrofit onto main housing 12 or provided as original equipment therewith. In retrofit applications, said brackets 30 are mounted on plate 32 which is then adhered or otherwise suitably secured to main housing 12. In such retrofit applications, plate 32 may be formed integrally with battery cover 20 so that the aforementioned expedient of replacing a conventional battery cover with a probe-holder-containing battery cover also provides said plate and brackets. Plate 32 is preferably formed of a rigid transparent plastic to permit the user to read instruction summaries or other information located on labels which may be adhered to main housing 12.

The second embodiment is depicted in FIGS. 2 and 3. It includes a cylindrical housing 40 formed by a large diameter part 41 and a smaller diameter part 43. Housing 40 includes a sensor 42 at a first end and a second sensor 44 at a second end thereof in back-to-back relation to one another. The sensors employ differing means to sense the coating thickness. For example, sensor 42 could be an eddy current sensor and sensor 44 could be a magnetic induction sensor. One of the sensors could be a Hall effect with temperature sensor, or an ultrasonic sensor, and so on, it being understood that this invention is not limited to any particular sensors nor any particular combination thereof.

Cable 16 intersects housing 40 at a right angle. A permanent magnet 46 is attached to a preselected end of housing 40 to aid users in determining whether or not a substrate is ferrous. Magnet 46 could also be attached to cable 16 or gauge main housing 12. (See FIGS. 1 and 2.)

As best understood in connection with FIG. 3, housing 40 houses an inner assembly including base 52; cable 16 extends into said base and the wires of said cable are joined to probes 42, 44 by connectors 54, 56, respectively. Said connectors and wires are then pushed into base 52 as probes 42, 44 are inserted into and secured to said base, typically by adhesives or potting materials. Compression springs 58, 60 contact base 52 when the assembly is in repose so that said base 52 is in the center of housing 40 when the device is not in use, as perhaps best understood in connection with FIG. 2.

The assembly is completed by installing outer sleeves 41 and 43 of device 40 in ensleeving relation to base 52; said outer sleeves may be fastened together by adhesives or by other suitable fastening means. It is important that base 52 holds probes 42 and 44 in axial alignment with one another and that outer sleeves 41 and 43 are similarly disposed in axial relation to one another to permit free axial movement of base 52 with respect to outer sleeves 41, 43 during use of device 40.

In use, when probe 42 is pressed against a coated surface, it retracts into outer sleeve 41 until said outer sleeve contacts said surface. As probe 42 is retracted into outer sleeve 41, base 52 slides an equal distance into outer sleeve 43, thereby compressing spring 60. Similarly, when sensor 44 is pressed against a coated surface, it retracts into outer sleeve 43 until said sleeve contacts said coated surface. As probe 44 retracts into outer sleeve 43, base 52 slides the same distance into outer sleeve 41, thereby compressing spring 58. Both springs are of a preselected length so that they are not substantially compressed when base 52 is at the midpoint of its travel within outer assembly 40. This design ensures that only one spring is under compression when one of the probes is in full contact with a coated surface. The ability of each probe to retract as it contacts a coated surface to be gauged prevents the tip of the probe from marring such surface.

Outer sleeve 41 has a noticeably larger outside diameter than outer sleeve 43 to provide means for identifying which sensor is in use, i.e., instructional materials would inform the user that the large diameter end of the device includes an magnetic induction sensor and that the small diameter end includes an eddy current sensor, as the case may be. Identification of sensors could also be facilitated by outer sleeves of differing colors or of differing knurled or turned grip patterns, and so on.

Figure 4:
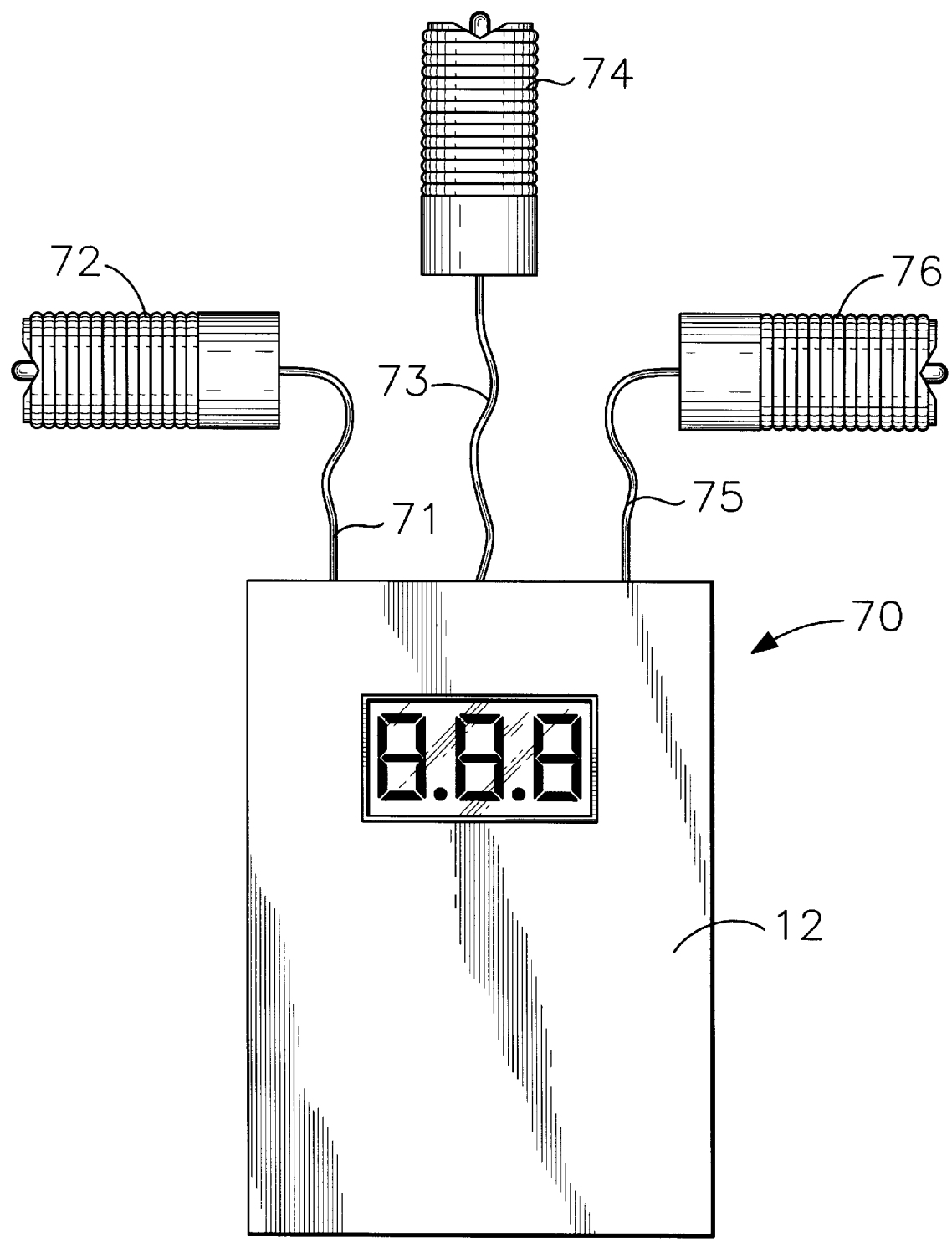
FIG. 4 is a side elevational view of the third embodiment.

FIG. 4 depicts an embodiment 70 where multiple sensors 72, 74, and 76 are attached to the gauge main housing 12 by independent cables 71, 73, and 75. This permits independent use of each sensor in hard to reach locations. More sensors and independent cables could be added as well.

Figure 5:
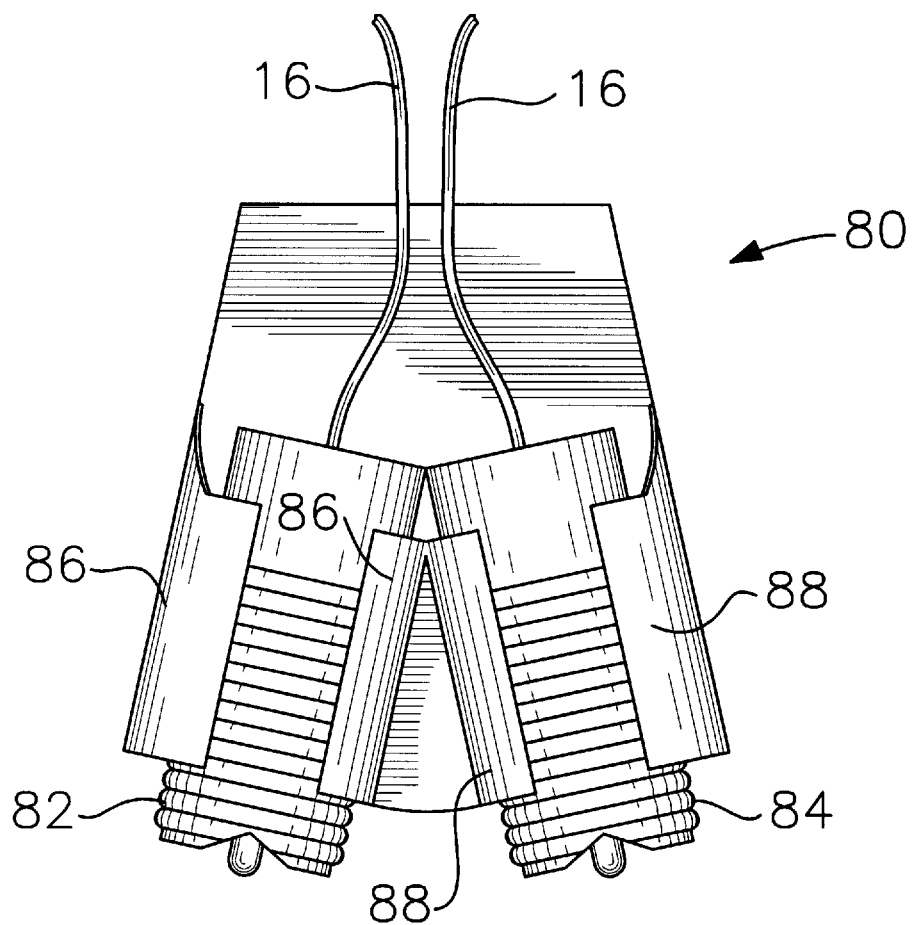
FIG. 5 is a side elevational view of the fourth embodiment.

FIG. 5 depicts an embodiment having a "V" shaped probe housing 80 that holds a pair of sensors 82, 84 by holders 86, 88 in a manner that enables the user to place either sensor in contact with the coated surface by simply rocking housing 80 from one sensor to the other about an axis normal to the plane of the paper. Note that the probes are inclined at a common, converging angle of inclination relative to a centerline of said housing.

Note further that housing 80 could be disc-shaped and a plurality of radially disposed probe holders and probes could be disposed thereabout, i.e., the invention is not limited to the "V"-shaped housing and the two probes and probe holders depicted.

Figure 6:
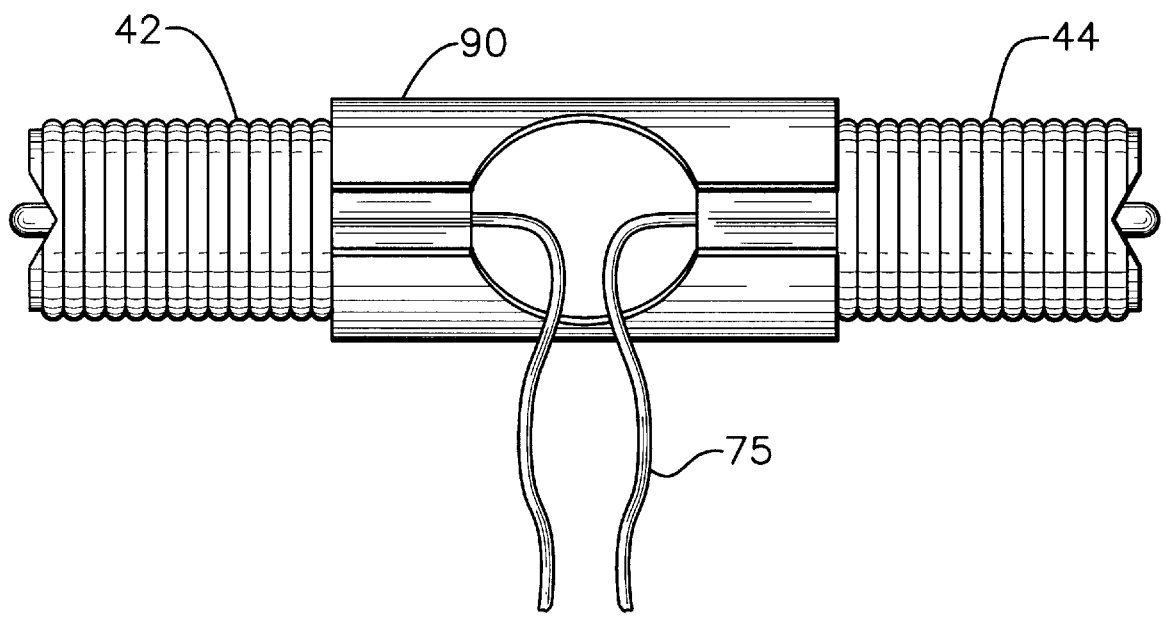
FIG. 6 is a side elevational view of a dual probe housing for supporting probes as shown in FIG. 3.

FIG. 6 depicts a housing 90 for supporting probes 42, 44 in a back-to-back relationship. Like the embodiment shown in FIG. 4, probes 42, 44 may be provided with independent cables 71, 73 to permit independent use of each probe in hard to reach locations. Similarly, as shown in FIG. 2, the cables 71, 73 may be joined into a single cable 16 still allowing for independent use of probes 42, 44 within housing 90.

Probe housing 40 of FIG. 2 could be provided with two separate cables and be removably attached to each sensor, or the "V" shaped housing 80 of FIG. 5 could be permanently attached to sensors with only one cable connecting the sensors to the gauge enclosure.

This invention is clearly new and useful. Moreover, it was not obvious to those of ordinary skill in this art at the time it was made.

It will thus be seen that the objects set forth above, and those made apparent from the foregoing description, are efficiently attained. Since certain changes may be made in the foregoing construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Now that the invention has been described,
What is claimed is:

1. An electronic thickness gauge, comprising:
    a main housing;
    a probe having a probe tip;
    an elongate cable for interconnecting said probe to said main housing;
    a probe holder mounted on said main housing;
    means for releasably holding said probe in said probe holder in a predetermined position of functional adjustment; said releasable holding means comprising a receptacle for restraining said probe in said predetermined position while simultaneously permitting said probe tip to move without restraint;
    said predetermined position of functional adjustment enabling use of said probe when said probe is positioned within said probe holder, wherein said probe and probe holder collectively provide perpendicular contact with a coated surface having a thickness to be measured by said gauge.

2. The gauge of claim 1, wherein said probe holder is removably mounted to said main housing.

3. The gauge of claim 2, further comprising a battery cover removably mounted to said main housing and wherein said probe holder forms an integral part of said battery cover.

4. The gauge of claim 3, further comprising an elongate flat plate and a pair of spaced apart brackets mounted to said elongate flat plate at opposite ends thereof, said flat plate being integral with said battery cover.

5. The gauge of claim 4, wherein said elongate flat plate is transparent.

6. The gauge of claim 1, further comprising a pair of spaced apart brackets mounted to said main housing to facilitate wrapping of said elongate cable thereabout when said probe is positioned within said probe holder.

7. The gauge of claim 1, further comprising mounting pads on one end of said main housing for supporting said main housing in said perpendicular contact with said coated surface; wherein said mounting pads are formed of rubber.

8. The gauge of claim 1, wherein said means for releasably holding said probe includes a set screw.

9. An electronic thickness gauge, comprising:
    a main housing;
    a first probe and a second probe positioned in back-to-back relation to one another and extending from and interconnecting with said main housing by an elongate cable;
    a probe housing supporting said first and second probes in said back-to-back relation, said probe housing further providing means for supporting said elongate cable;
    each of said probes having a probe tip at one end of said of said probes and having different means for gauging a coating thickness; and
    wherein either of said probes may be used in a location remote from said main housing.

10. The gauge of claim 9, further comprising:
    a cylindrical base member slideably mounted within said probe housing;
    a pair of bias means positioned within said housing, each bias means of said pair of bias means having an innermost end disposed in abutting relation to an associated end of said cylindrical base member and each bias means ensleeving an associated probe;
    each bias means selected so that when said cylindrical base member is positioned mid-length of said housing, neither bias means is under compression.

11. The gauge of claim 9, wherein said first probe is an eddy current probe and said second probe is a magnetic induction probe.

* * * * *